(12) United States Patent
Littlewood et al.

(10) Patent No.: US 9,798,814 B2
(45) Date of Patent: Oct. 24, 2017

(54) COMPUTER SYSTEMS AND COMPUTER-IMPLEMENTED METHODS FOR PROVIDING TRAINING CONTENT TO A USER

(71) Applicant: Excel with Business Limited, London (GB)

(72) Inventors: Christopher Littlewood, London (GB); Matilde Teixeira Dias Castanheira, London (GB); Matias Gabriel, London (GB); Brian Thai, London (GB)

(73) Assignee: EXCEL WITH BUSINESS LIMITED, London (GB)

( * ) Notice: Subject to any disclaimer, the term of this patent is extended or adjusted under 35 U.S.C. 154(b) by 253 days.

(21) Appl. No.: 14/540,395

(22) Filed: Nov. 13, 2014

(65) Prior Publication Data
US 2015/0205874 A1    Jul. 23, 2015

(51) Int. Cl.
*G09B 5/00* (2006.01)
*G06F 17/30* (2006.01)
*G09B 5/12* (2006.01)

(52) U.S. Cl.
CPC ......... *G06F 17/30867* (2013.01); *G09B 5/12* (2013.01)

(58) Field of Classification Search
CPC ........ G09B 5/12; G09B 7/00; G06F 17/30867
See application file for complete search history.

(56) References Cited

U.S. PATENT DOCUMENTS

| | | | | |
|---|---|---|---|---|
| 2004/0197759 A1* | 10/2004 | Olson | ...................... | G09B 7/02 434/322 |
| 2005/0015291 A1* | 1/2005 | O'Connor | .............. | G06Q 10/10 434/219 |
| 2010/0159437 A1* | 6/2010 | German | ................... | G09B 7/02 434/433 |
| 2013/0224699 A1* | 8/2013 | Jastrzembski | ......... | G09B 19/00 434/219 |
| 2014/0272833 A1* | 9/2014 | Gupta | .................... | G06Q 10/10 434/219 |
| 2014/0272914 A1* | 9/2014 | Baraniuk | ............. | G06N 99/005 434/362 |
| 2015/0248739 A1* | 9/2015 | Schulman | .......... | G06Q 50/2053 434/322 |

* cited by examiner

*Primary Examiner* — Peter Egloff
(74) *Attorney, Agent, or Firm* — Fredrikson & Byron, P.A.

(57) ABSTRACT

Computer systems and computer-implemented methods for providing training content to a user through processing information from a user to select an estimate of most-useful course modules from a plurality of possible course modules, based on a received user input such as a users answers to a plurality of filtering questions. When a user provides feedback on the usefulness of the selected course modules, the computer system is updated to select more useful content for future users.

10 Claims, 6 Drawing Sheets

| UserID | User input | | | Modules - need to know | | | | | | | | | Modules - don't already know | | | | | | | | |
|---|---|---|---|---|---|---|---|---|---|---|---|---|---|---|---|---|---|---|---|---|---|
| | Job | Target prof | Task importance | 001 | 002 | 003 | 004 | 005 | 006 | 007 | ... | 160 | 001 | 002 | 003 | 004 | 005 | 006 | 007 | ... | 160 |
| 652238 | Accnt | Very | Often | Y | Y | Y | N | N | Y | N | ... | N | Y | Y | N | Y | N | Y | Y | ... | N |
| 329850 | Anlst | Master | Often | Y | N | Y | ? | ? | ? | Y | ... | Y | N | N | N | ? | ? | ? | N | ... | N |
| 779668 | Tchr | Very | Sometimes | Y | ? | Y | Y | N | N | N | ... | N | Y | ? | Y | Y | Y | Y | N | ... | Y |
| 724902 | Engr | Basics | Never | N | Y | N | N | N | N | Y | ... | N | Y | Y | Y | Y | N | N | N | ... | N |

COMPUTER SYSTEMS AND COMPUTER-IMPLEMENTED METHODS FOR PROVIDING TRAINING CONTENT TO A USER

TECHNICAL FIELD

This disclosure relates to computer systems and computer-implemented methods for providing training content to a user. In particular, this disclosure relates to processing information from a user to select an estimate of most-useful course modules from a plurality of possible course modules.

BACKGROUND

Throughout all industrial, commercial and educational environments, there is a need to provide content, which may include news and information regarding the workplace, to a group of people such as a workforce.

One important example is the provision of content for the training of a workforce. As, for example, private sector companies, federal, state, and local governments work to improve their organizations, there arises a need to provide training content to members of the workforce to develop the workforce. The sheer number of training courses available, for example, from in-house, university and private sector providers, can mean that it is difficult to select the most appropriate course or courses for a member of the workforce.

Providing inappropriate content is wasteful since there is always a cost incurred by studying training content such as a course module, either in time or external expenditure. It would be beneficial if computer systems existed to prevent the provision of inappropriate training content.

Currently there exist computer systems that try to predict the most appropriate training content, wherein a computer-implemented filter processes input data provided by the user and outputs, to the user, information based on the input data provided by the user. In some existing systems, the computer-implemented filter tries to provide most-useful content to the user, based on the input data provided by the user. However, it can be difficult to determine what content is most appropriate.

Some systems use a needs-assessment—consisting of a set of questions relating to individual training requirements—to tailor content pertinent to each user. This can take the form of a paper-based survey completed prior to studying provided information, or an online survey. One such example is the system provided by the Corporate Coach Group (Corporate Coach Training Ltd of Gloucestershire, UK) in which a "training needs analysis" questionnaire is completed by a trainee to determine strengths and weaknesses; see https://corporatecoachgroup.com/courses/training-needs-analysis.

Other systems select course modules to present to the user based on their previous use of the training material. For instance, if a user performs well in a test at the end of a topic, they might be presented with more stretching training material on the next topic. If they perform less well in the test, they might be presented with more basic material on the same topic. An example of this sort of 'adaptive' approach to training is marketed by Knewton, Inc of New York, USA; see http://www.knewton.com.

SUMMARY

In general, this disclosure describes computer systems and computer-implemented methods for selecting content that is valuable to an individual user. In particular, this disclosure describes computer systems and computer-implemented methods for selecting training content that is valuable to an individual user. Explicit user feedback on the usefulness of training content is used to select more valuable content for future users. An example of the training content is a selection or syllabus of course modules for studying by a user.

By updating the computer system using the feedback, the reliability and accuracy of predictions made by the computer system are improved and the computer system functions in an improved way compared to a standard computer system. Since a computer system that makes better predictions is better than a computer system that makes poorer predictions, the computer systems of this disclosure function as better computer systems.

According to a first aspect of the invention, there is provided a computer-implemented method for providing course modules to a user comprising: receiving, on a computer system, a user input; processing the user input to select an estimate of most-useful course modules for the user from a plurality of course modules, wherein selecting the estimate of most-useful course modules comprises performing a computation using the received user input and a database stored in an electronic data store, and selecting one or more of the plurality of course modules based on the result of the computation; outputting the selected estimate of most-useful course modules to the user; receiving, on the computer system, feedback from the user on the estimate of most-useful course modules; and updating, on the computer system, the database in the electronic data store based on the received feedback.

According to a second aspect of the invention, there is provided a computer system for providing course modules to a user comprising: at least one processor; a memory in electronic communication with the at least one processor; an external interface; and instructions stored in the memory, the instructions being executable to: receive, at the external interface, a user input; process, using the at least one processor, the user input to select an estimate of most-useful course modules for the user from a plurality of course modules, wherein selecting the estimate of most-useful course modules comprises: performing a computation using the received user input and a database stored in an electronic data store, and selecting one or more of the plurality of course modules based on the result of the computation; output the selected estimate of most-useful course modules to the user; receive, on the external interface, feedback from the user on the estimate of most-useful course modules; and update the database in the electronic data store based on the received feedback.

According to a third aspect of the invention, there is provided a computer system for providing course modules to a user comprising: means for receiving, on the system, a user input; means for processing the user input to select an estimate of most-useful course modules for the user from a plurality of course modules, wherein selecting the estimate of most-useful course modules comprises: performing a computation using the received user input and a database stored in an electronic data store, and selecting one or more of the plurality of course modules based on the result of the computation; means for outputting the selected estimate of most-useful course modules to the user; means for receiving, on the system, feedback from the user on the estimate of most-useful course modules; and means for updating, on the system, the database in the electronic data store based on the received feedback.

According to a fourth aspect of the invention, there is provided a non-transitory, tangible computer-readable medium having instructions thereon, the instructions comprising: code for receiving a user input; code for processing the user input to select an estimate of most-useful course modules for the user from a plurality of course modules, wherein selecting the estimate of most-useful course modules comprises: performing a computation using the received user input and a database stored in an electronic data store, and selecting one or more of the plurality of course modules based on the result of the computation; code for outputting the selected estimate of most-useful course modules to the user; code for receiving, on the computer system, feedback from the user on the estimate of most-useful course modules; and code for updating the database in the electronic data store based on the received feedback.

According to a fifth aspect of the invention, there is provided a computer program for carrying out a method as described herein.

As a consequence updating the database in the electronic data store based on the received feedback, the information contained in the database that is used to help estimate the usefulness of course modules may be improved such that future selections may have a greater likelihood of being useful or valuable to future users.

The user input may comprise a user's answers to a plurality of questions. Alternatively or additionally the user input may comprise details of the user's training history. Alternatively or additionally, the user input may comprise details of the user's employment record, which may be provided by a third party such as the user's employer. The system may also make a network connection to the user's employer and extract information from an employment database of the user's employer and use such information as the sole user input or in combination with other user input.

The feedback on the estimate of most-useful course modules may comprise, for at least one course module, a first feedback element and a second feedback element. The first and second feedback elements may be Boolean elements.

The first feedback element may be indicative of whether the course module needed to be known by the user and the second feedback element may be indicative of whether the course module was already known by the user.

The database in the electronic data store may comprise a plurality of user profile records wherein, for each of the user profile records included in the database, the database stores an estimate of most-useful course modules; and wherein further stored in the database are, a user profile record generated from the received user input and the estimate of most-useful course modules selected for the user.

Determining whether a course module is selected may comprise: computing, for the user profile record generated from the user input, for each course module, a first probability and a second probability; and comparing the first and second probabilities with a threshold. Comparing the first and second probabilities with a threshold may comprise comparing the product of the first and second probabilities with a threshold.

The first probability may comprise a probability that the course module needs to be known by the user and the second probability may comprise a probability that the course module is not already known by the user.

Computing the first probability for the user for a course module may comprise: dividing the database into a plurality of clusters based on a cluster analysis of user profile records stored in the database; for each of the plurality of clusters, computing: a first probability for each course module, a cluster centre, and a distance from the user profile record generated from the user input to the cluster centre; assigning to the user the cluster for which the distance from the user profile record of the user to the cluster centre is the smallest; and assigning to the user, for each course module, the determined first probability for the respective course module of the assigned cluster. The cluster analysis may be a k-means analysis, a k-modes analysis or an expectation-maximization analysis.

Computing a first probability for each course module for each of the plurality of clusters may comprise dividing the number of user profile records in the cluster for which a first feedback element is stored and is affirmative by the number of user profile records in the cluster for which a first feedback element is stored.

Computing the distance from the user profile record generated from the user input to a cluster centre may comprise computing the Euclidean norm of the difference between the user profile record generated from the user input and the cluster centre.

Computing the second probability for the user for a course module may comprise: initializing the second probability as an average probability; performing a Bayesian update on the database based on the user profile record generated from the user input; and recalculating the second probability based on the updated database.

Initializing the second probability as an average probability may comprise: dividing the number of user profile records in the database for which a second feedback element is stored and is affirmative by the number of user profile records in the database for which a second feedback element is stored.

The database may be implemented on a server and the user profile record and feedback may be received from a client machine. The electronic data store may form part of the server or may be a network-connected storage located physically outside of the sever but nonetheless accessible by the server.

Updating the database in the electronic data store may comprise updating the database based on the received feedback from a plurality of users, the updating being only performed at predetermined intervals. The feedback may be only received from users at a predetermined interval. The feedback may be cached locally on a client machine.

The user profile record generated from the user input may further comprise details of previous course modules studied by the user. Alternatively or additionally, the generated user profile record generated from the user input may further comprise user information obtained from a third-party database.

The system may alternatively comprise instructions stored in an electronic data store other than a memory, such as a hard disk or any other processor-readable or computer-readable medium.

BRIEF SUMMARY OF THE DRAWINGS

The invention will be described in more detail by way of example only with reference to the accompanying drawings, in which.

DETAILED DESCRIPTION OF THE INVENTION

An example computer system embodying an aspect of the invention will now be described with reference to the accompanying drawings.

Figure 1:
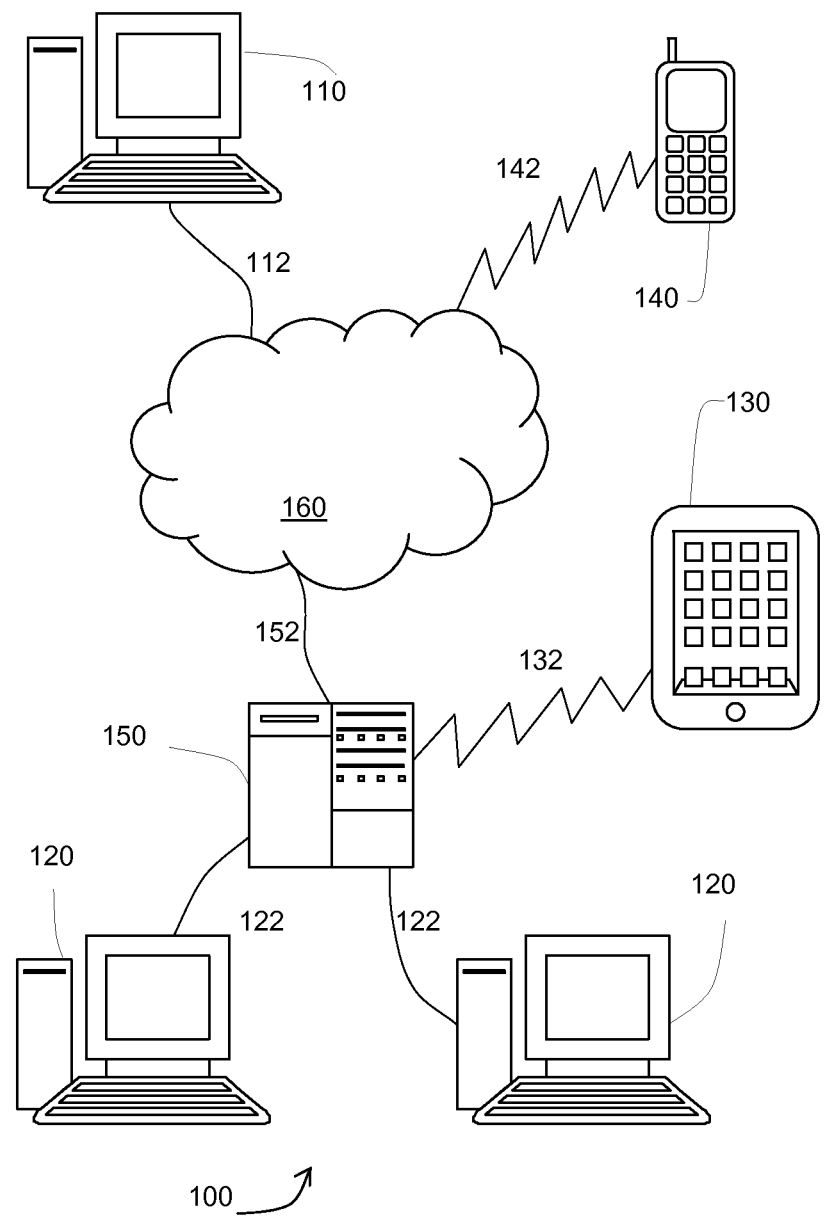
FIG. 1 is a block diagram illustrating a computer system including computer terminals embodying an aspect of the present invention.

FIG. 1 illustrates an example computer system on which the computer-implemented method for providing course modules to a user operates. The computer system includes a server 150 to which one or more computer terminals 120 are connected through wired connections 122. The computer terminals 120 are shown as desktop computers. However, they may be other devices such as laptop computers, smart phones or tablet computers. The wired connections 122 may be through Ethernet connections of a local area network. As an alternative to wired connections, the computer terminals 120 may be connected to the server through wireless connections or through connections that have wired and wireless portions. For example, FIG. 1 shows a tablet computer 130 connected to the server 150 through a wireless connection 132. The server 150 is shown as connected to the internet 160 through wired connection 152. This allows other computer terminals that are not in a close enough geographic proximity for direct wired or wireless connection to the server 150 to be connected to the server 150. For example, in FIG. 1, a computer terminal 110 is connected to the internet 160 through wired connection 112. The computer terminal 110 is shown in FIG. 1 as a desktop computer purely as an example. A further example is a cellular phone 140 that is connected to the internet 160 through a wireless connection 142. The cellular phone 140 may be a smart phone.

The server 150 is shown in a local area network with computer terminals 120 directly connected to the server 150 through wired connections 122. Alternatively, the server 150 may be located in a cloud-computing environment. In such cases, the server 150 may be a virtual server running on a virtual machine on a physical server. There may be multiple virtual servers running on virtual machines on a server. According to resource requirements and availabilities, the virtual servers may be scaled up, scaled down, or moved around between physical servers.

Figure 3:
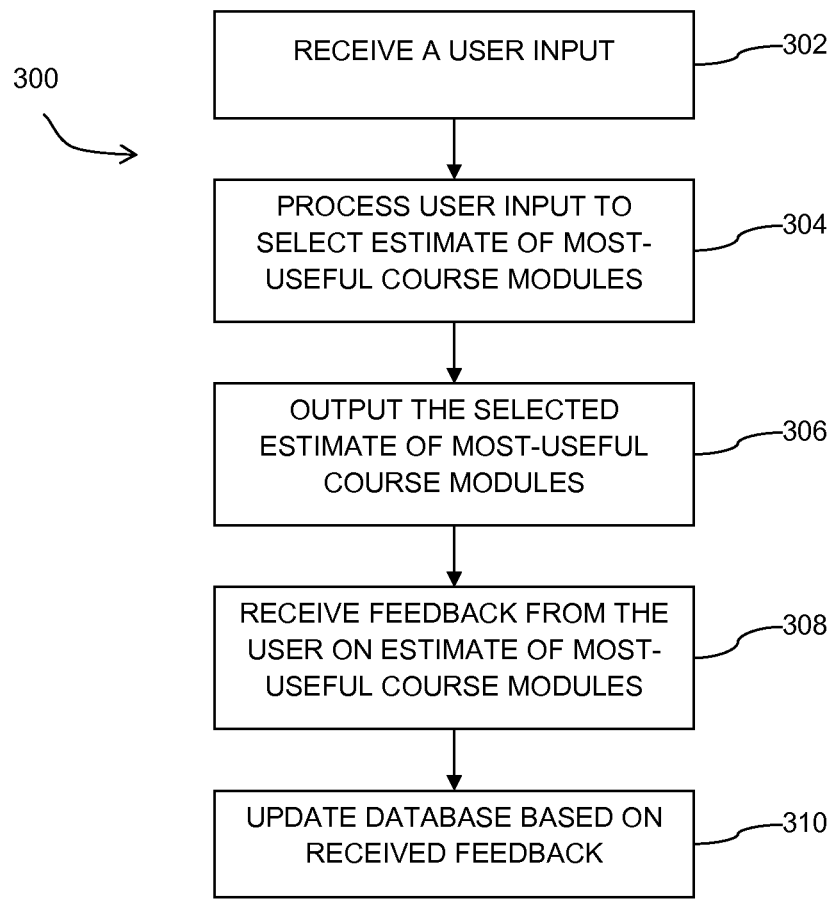
FIG. 3 is a flow diagram illustrating a computer-implemented method embodying an aspect of the present invention.

FIG. 3 is a flow diagram illustrating a computer-implemented method 300 embodying an aspect of the present invention. To begin, at step 302, a user at a network-connected client computer terminal 110 completes a filter questionnaire, thereby providing answers to a plurality of questions, to provide input for use in selecting the most appropriate content modules for the user. The user input is transmitted electronically to the server 150 by HTTP. Alternatively or additionally, the user input may be transmitted by email or by a protocol such as FTP or more secure variations such as HTTPS and SFTP. The filter questionnaire comprises questions for determining the user's intended application of the course modules and the user's current proficiency in the subject. Alternatively or additionally, the user input may comprise information indicative of one or more of previous training undertaken by the user, previous course modules selected for the user. Alternatively or additionally, the user input may comprise information obtained from a third-party database such as an employee profile database controlled by the user's employer, such as details of the user's employment.

Figure 2:
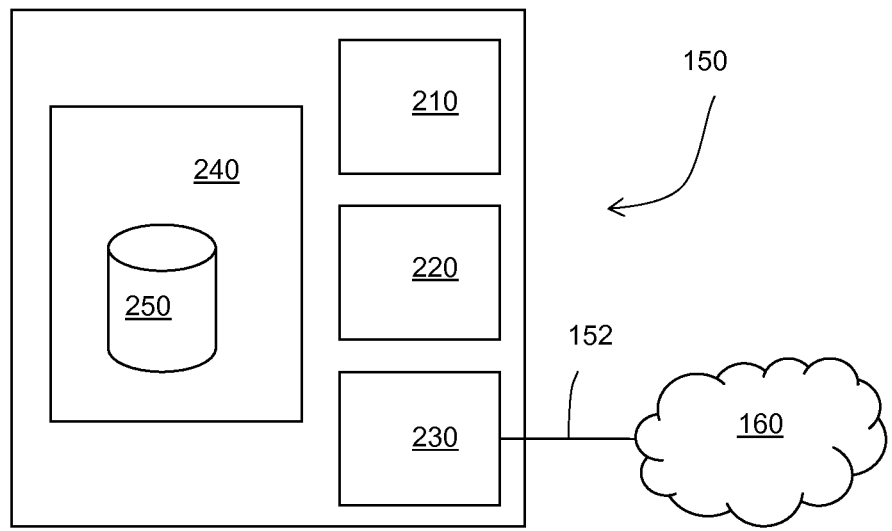
FIG. 2 is a block diagram illustrating a computer system embodying an aspect of the present invention.

FIG. 2 shows the server 150 in more detail. The server 150 comprises a processor 210, a memory 220, an external interface 230 and an electronic data store 240 in the form of a hard disk drive. The external interface connects to the internet 160 through wired connection 152. The electronic data store 240 stores a database 250. The server 150 receives the input at step 302 via the external interface 230 and the processor 210 selects for the user an estimate of most-useful course modules from a plurality of possible course modules. The database 250 comprises, for each entry, a unique user code identifying individual users for which data is stored, a user profile record, and data for the estimate of most-useful course modules. Upon receipt of the input from the user and upon determining that the database does not already store data for the user, a new user profile record is created using the unique user code of the user and the received input.

At step 304, the processor 210 performs a computation using the received user input and the database 250 to either select or not select each of the plurality of course modules based on the computation. In a mode of operation, the processor 250 selects all course modules that the computation suggests for the user. In another mode of operation, the processor 210 selects a subset of the course modules that the computation suggests for the user. For example, the processor 210 may select the top 5 estimated most-useful course modules. The result of the computation is a selection of estimated most-useful course modules for provision to the user. The selection may also be termed an estimated most-useful syllabus for the user. The selection of estimated most-useful course modules for the user is stored in the database 250 by the unique user code of the user.

At step 306, the server 150 then outputs the selected estimate of most-useful course modules. More specifically, the server 150 electronically transmits to the user the selection of estimated most-useful course modules via the external interface 230. Transmitting to the user the selection of estimated most-useful course modules comprises providing a web page to the client computer 110, the page comprising one or more hyperlinks linking to the selected course modules, such that the user's clicking on the hyperlinks triggers the start of training of the respective course module at the client computer 110. Alternatively or additionally, the user may be provided with a list of the course modules selected, the user being required to make their own arrangements for the studying of the selected course modules. Alternatively or additionally, training of the selected estimated most-useful course modules may begin immediately at the client computer 110 and the server 150 serves content for the training of the selected estimated most-useful course modules immediately to the client computer 110. The user receives the selection of estimated most-useful course modules. The user then carries out training based on the syllabus selected for the user by the processor 210 of the server 150.

At step 308, after a user is finished with a course module, either because it has been completed or because the user has decided that there is no need to study it, the user provides feedback. In embodiments where the training for the course module is completed on the client computer 110, the user may be presented with a request for feedback immediately on completion or as an option during the training. In another embodiment, the training for the course module is completed on tablet computer 130 and the user may be presented with a request for feedback immediately on completion or as an option during the training using the tablet computer 130.

Alternatively, the user provides feedback after the user is finished with all of the course modules in the syllabus. The user reviews the syllabus and provides, for each course module, feedback in the form of an indication as to whether each course module was useful. The user may indicate that a course module (i.e. its content) was already known by the user, or not already known by the user. The user may also indicate that the course module (i.e. its content) needed to be known by the user, irrespective of whether the user already knew the content; if the course module needed to be known then it taught skills or knowledge that were or would have been useful to the user. The user may also provide feedback on course modules not selected as part of the estimated most-useful course modules. For example, the user may indicate that a course module not selected actually needed to be known because it taught skills or knowledge that would have been useful to the user.

Figure 4:
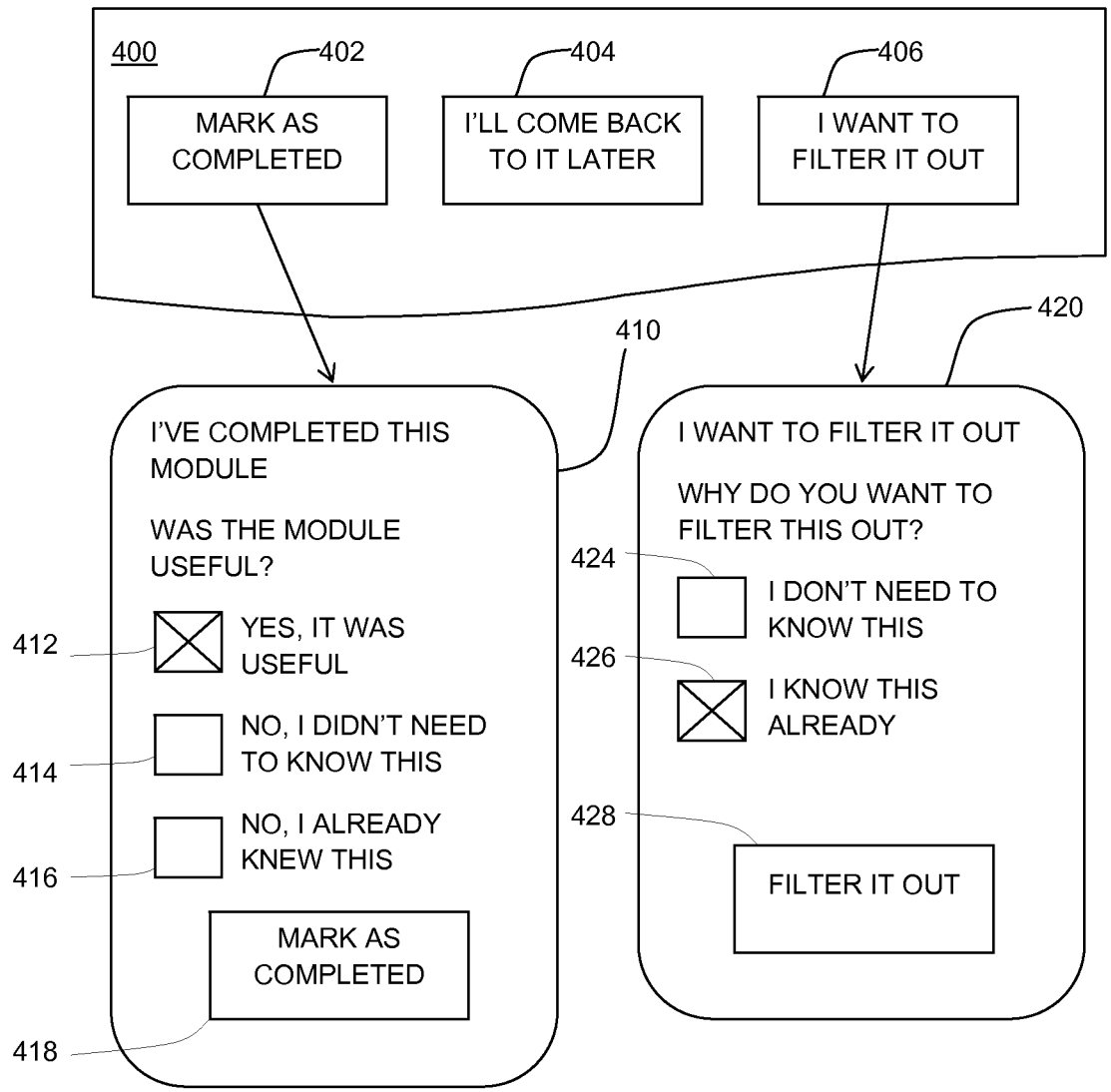
FIG. 4 is a schematic user interface diagram of an example user interface of a computer system embodying an aspect of the present invention.

FIG. 4 shows a portion of a user interface 400 provided to the user on the client computer 110 available during the training for a course module, the user interface 400 comprising three interaction elements in the form of buttons, the first button 402 titled "MARK AS COMPLETED", the second button 404 titled "I'LL COME BACK TO IT LATER", and the third button 406 titled "I WANT TO FILTER IT OUT". The user is able to select the most appropriate option according to whether or not the course module is complete and/or whether the user wishes to filter out the course module, without necessarily completing the training for the course module. By activating the "MARK AS COMPLETED" button (first button 402), a first feedback window 410 is presented to the user demanding feedback from the user about the course module, by selecting from three options 412, 414, 416, and by confirmation via a confirmation button 418. The user may indicate that the course module was useful via first option 412, if user needed to know the content of the course module via second option 414, or if the user already knew the content of the course module via third option 416 and activate the confirmation button 418 to confirm that the course module is to be marked as completed with the feedback provided by the user. By activating the "I WANT TO FILTER IT OUT" button (third button 416), a second feedback window 420 is presented to the user demanding feedback as to why the user wishes to filter out the course module, by selecting from two options 424, 426 and by confirmation via a confirmation button 428. The user may indicate if user needed to know the content of the course module via first option 414 or if the user already knew the content of the course module via second option 426, and activate the confirmation button 428 to confirm that the course module is filtered out with the feedback provided by the user.

The feedback is electronically transmitted immediately from the client computer terminal 110 to the server 150. In alternative embodiments, the feedback may be cached locally at the client computer terminal 110, with the feedback being electronically transmitted to the server 150 periodically. In configurations in which the wired connection 112 is not permanently available or in which a wireless connection 132 is intermittent, this may be advantageous. For example, the feedback may be electronically transmitted to the server 150 at weekly intervals. Alternatively, the feedback may be electronically transmitted to the server 150 in response to a request for feedback sent to the client computer terminal 110 from the server 150. For example, the server 150 may poll the client computer 110 periodically, such as at weekly intervals, to check whether the client computer 110 has feedback cached locally and available for transmission to the server 150.

On receipt of the feedback from the user, at step 310, the server 150 uses the feedback to deduce what a more useful selection of course modules would have been for that user as a revised estimate of most-useful selection of course modules, and stores the revised estimate of most-useful selection of course modules in the database 250 for the user.

Figures 5, 7:
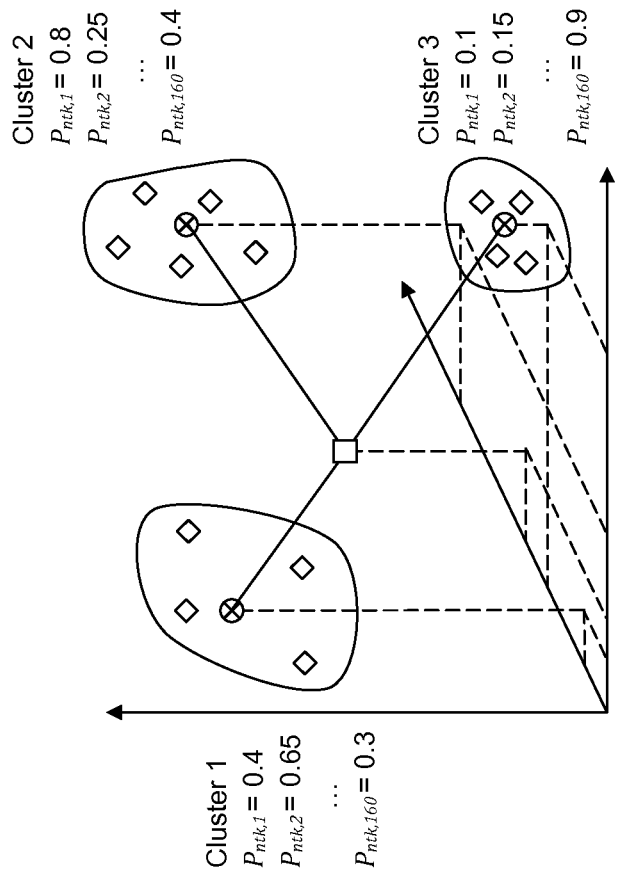
FIG. 5 is an example extract of a database according to an aspect of the present invention.
FIG. 7 is a plot on three-dimensional Cartesian axes showing an example result of a cluster analysis according to an aspect of the present invention.

FIG. 5 shows an implementation of the database 250 in a flat file table format, showing four records corresponding to four different users, each assigned a unique user identification number ("UserId"), in this case the arbitrary numbers 652238, 329850, 779668 and 724902. Stored against each unique UserId is user input received from the users, the user input comprising, purely as an example, a job field, a target proficiency and a task importance. In FIG. 5, each of the four users have supplied different user input. Stored for each of a plurality Nm of course modules—160 course modules in this example—is an indication of whether the user needs to know the module, "need-to-know" or "ntk". "Y" is stored if the user needs to know the module, "N" is stored if the user does not need to know the module, and "?" is stored if it is unknown whether the user needs to know the module. Also stored for each of the plurality of course modules is an indication of whether the user doesn't already know the module—"don't-already-know" or "dak". "Y" is stored if the user doesn't already know the module, "N" is stored if the user does already know the module, and "?" is stored if it is unknown whether the user already knows the module.

When configured initially, or for a new user, there is no information for the user and the database does not know whether a course module is needed to be known or already known and so the fields for the course modules for the user are initialized to "?".

Once feedback is received, as captured for a course module by feedback windows 410, 420, the database 250 is updated as indicated in step 310 of FIG. 3. If the course module concerned skills or knowledge that are useful to the user then, for the user and for the module, ntk is set to Y and dak is set to Y. If the user marked the course module as didn't need to know then, for the user and for the module, ntk is set to N and dak is set to Y. If the user marked the course module as already knew, then, for the user and for the module, ntk is set to Y and dak is set to N. If the user marked the course module as didn't need to know AND already knew, then, for the user and for the module, ntk is set to N and dak is set to N.

In alternative embodiments, the database 250 may be implemented in other database formats. For example the, need-to-know and don't-already-know information may be stored in a separate tables and/or as part of a relational database. This may be in the form of an array or matrix of numerical values corresponding to the possible values of the fields. For example, the matrix of numerical values may store a 1 for "Y", 0 for "?" and −1 for "N".

The computation performed by the processor 210 to select or not select each of the plurality of course modules uses the correlation between the received user input and the user input and feedback that has been previously stored in the database 250 to assign course modules to each new user.

The computation provides for the user, for each course module, an output consisting of two numerical values. The first numerical value is an estimated probability ($P_{ntk}$) that the user needs to know the content of the course module, i.e. that it teaches skills or knowledge that would be useful to the user. The second numerical value is the estimated probability ($P_{dak}$) that the user does not already know the content of the course module. The product of these probabilities ($P_{ntk} \cdot P_{dak}$) gives an estimated likelihood that a user needs to study the content of the course module. If the product ($P_{ntk} \cdot P_{dak}$) is above a threshold then the course module is selected: it is included in that user's selection of estimated most-useful course modules.

In another mode of operation, the processor 250 selects a fixed or selectable number of course modules having the highest computed product for $P_{ntk} \cdot P_{dak}$. The computed product may be provided to the user as part of the selection, so that the user may make their own informed decision to prioritize training for course modules. The user may also be provided, for each selected course module, an indication of how confident the system is in the estimation of $P_{ntk}$, $P_{dak}$ or the product $P_{ntk} \sim P_{dak}$.

$P_{ntk}$ and $P_{dak}$ are computed using different computer-implemented methods adapted to the particular quantities being estimated.

Figure 6:
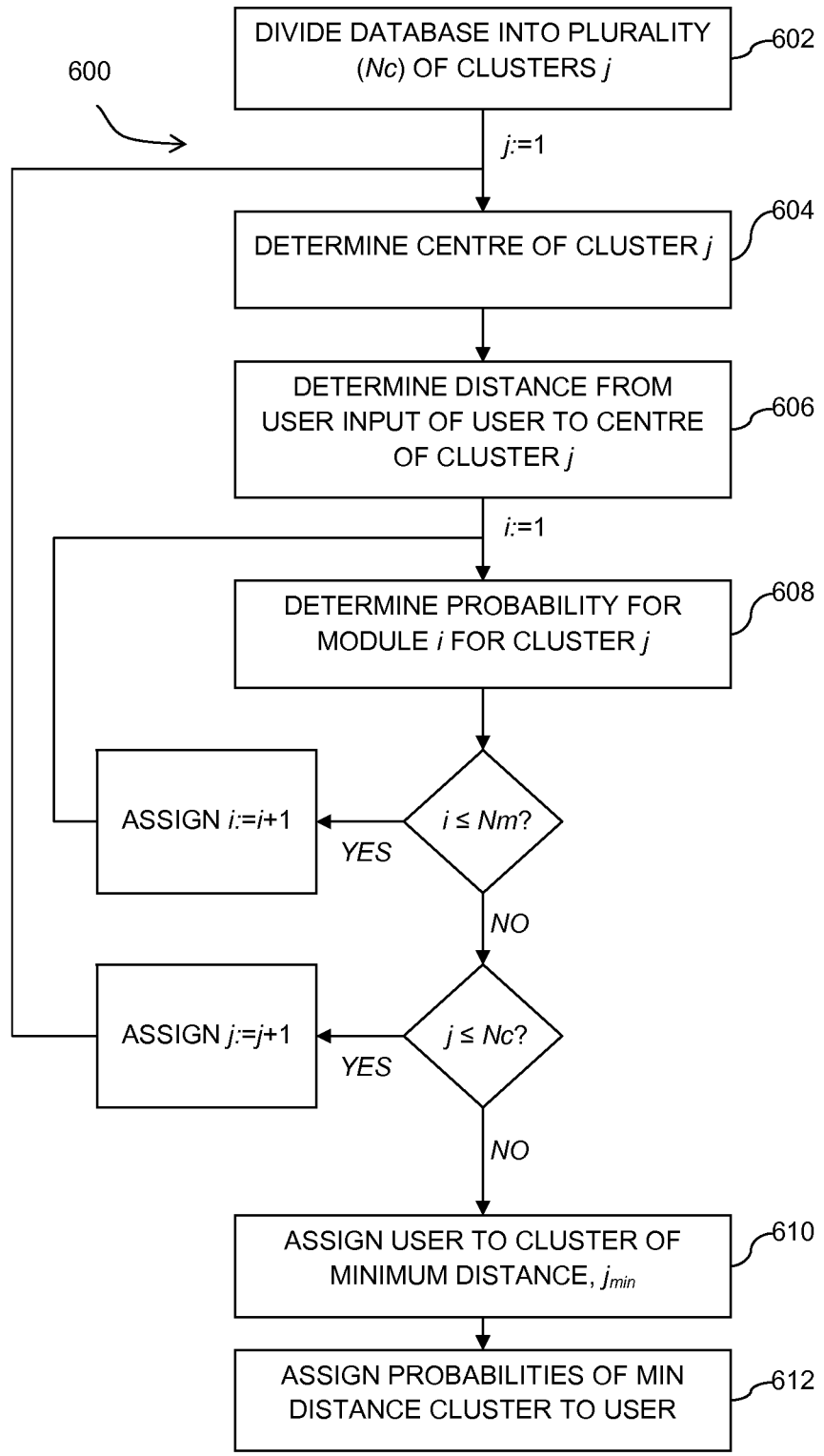
FIG. 6 is a flow diagram illustrating a computer-implemented method of computing a first probability according to an aspect of the present invention.

FIG. 6 shows a flow diagram illustrating a computer-implemented method 600 for computing a first probability: $P_{ntk}$. At step 602, users are divided into a plurality of groups, or clusters, based on the user inputs of the users according to the results of a cluster analysis. The cluster analysis may be a k-means analysis, k-modes analysis or an expectation-maximisation analysis. The appropriate number of clusters (Nc) depends on the number of records stored in the database. In the described implementation, 6 clusters were considered to be appropriate initially, although as the database increased in size, this was increased to 12.

At step 608, for each cluster j and for each course module i, $P_{ntk}$ is calculated from the database 250 by dividing (the total number of users in the cluster for whom ntk=Y for that module) by (the total number of users in the cluster for whom ntk=Y or ntk=N for that module). By calculating it in this manner, users for whom there is no current data for the course module, i.e. the database 250 stores "?" for the course module, are not included in the computation. The number of users for which records in the database 250 are included in the calculation affect the confidence the computer system may have in the estimate.

At step 610, new users are assigned to the cluster which is closest to their own user input in the multidimensional space of user input parameters. To determine this, at step 606, the distance from the parametric centre of each cluster to the user profile record generated from the user input. The parametric centre is calculated at step 604 according to the mean of the cluster, although in other embodiments the parametric centre may be a modal or medoid value. The calculated distance is the Euclidean norm of the multidimensional difference, i.e.

$$\sqrt{\Sigma_{k=1}^{Np}(x_k - centre_k)^2}, \quad (1)$$

in which k varies over all of the multidimensional space of user input parameters and the total number of parameters in the user input is Np. For user input parameters that are not numerical, it is necessary to convert the parameters to numerical values. Preferably this is the way in which the information is stored in the database 250, to minimize unnecessary recalculations. A user input parameter that is a selection from a multiple choice is straightforwardly converted to one of a numerical range. For example, if the user input parameter concerns how important a particular factor is for the user and may take one of four possible options, "not important", "slightly important", "moderately important" and "very important", these may be converted directly to the numbers 1 to 4.

The user is then assigned at step 610 to the cluster with the centre that is closest to the user profile record. At step 612, for each course module, $P_{ntk}$ for the user is set as the estimate $P_{ntk}$ that has been calculated for each module from the cluster to which the user has been assigned, i.e. the cluster for which the distance from the user's user input to the cluster's parametric centre was the smallest.

FIG. 7 shows an example visualization of an aspect of the computation of $P_{ntk}$, in which for the purpose of visualization the multidimensional space of user input parameters is limited to three dimensions. User inputs according for each user stored in the database 250 are plotted in the three dimensional space as diamond symbols and the user inputs are divided into three clusters. In practice, Np is normally greater than three and so a three-dimensional visualization is not possible, but the calculation of the distance as the Euclidean norm of the multidimensional difference generalizes to dimensions greater than three.

For each cluster and for each of 1 to Nm course modules, a probability $P_{ntk,1}$ to $P_{ntk,Nm}$ is calculated, where Nm is 160 for this example. The parametric centres of each cluster are also plotted as crossed circles at the centre of each cluster and the user input of a new user is plotted as a square. The distances in three-dimensional user input parameter space between the user input of the new user and the parametric centre of each cluster are shown by lines in FIG. 5 and, in this example, the distance to the parametric centre of the first cluster is the smallest. For the new user, $P_{ntk,1}$ to $P_{ntk,Nm}$ are assigned from the calculated values of the first cluster.

When a subsequent cluster analysis is performed on the user inputs of the database 250, the cluster analysis takes into account previously added new user, which means the determined clusters and parametric centres of the clusters will be different.

In alternative embodiment, then this process may be modified to not calculate all probabilities for all modules for all clusters but instead only for the cluster with a parametric centre that is the closest to the user's user input in parameter space, thus avoiding calculating probabilities for a cluster to which the user is not assigned.

Figure 8:
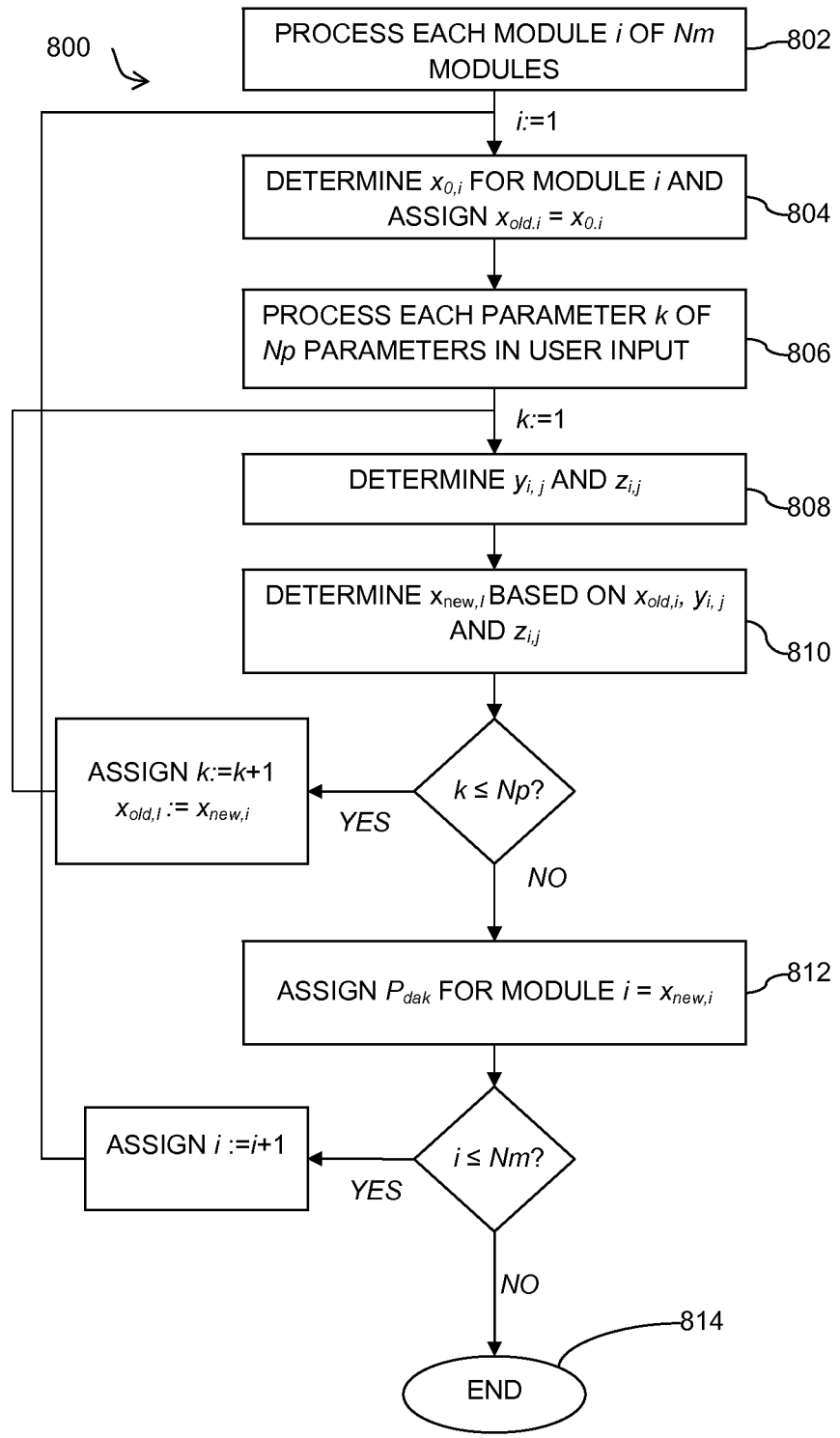
FIG. 8 is a flow diagram illustrating a computer-implemented method of computing a second probability according to an aspect of the present invention.

FIG. 8 shows a flow diagram illustrating a computer-implemented method 800 of computing a second probability: $P_{dak}$. In the computation of $P_{dak}$ a different approach is used than with $P_{ntk}$. The process operates over each module i of Nm modules (step 802) and for each parameter k of Np parameters in the user input (step 806). At step 804, as a starting point for the user, an initial estimate of $P_{dak}$ for course module i, here denoted by $x_{0,i}$, is set as the proportion of historic users who left feedback for the course module i and indicated that they did not already know the content of the course module. Each parameter of the user's user input is then taken into account, with the likelihood that the user needs to know the course module being recalculated according to Bayes' theorem.

At step 808, a number of quantities are calculated from the information stored in the database 250. The calculation proceeds for each course module i of the Nm course modules, and for each parameter k of the parameters Np in the user input, where j is the value of the user's user input at parameter k. These quantities are: $x_{0,i}$, the prior likelihood that a user doesn't already know for each course module i, $y_{i,j}$, the probability that a user who doesn't already know course module i has, at parameter k of the input space, provided the particular parameter value j that the user has provided, and $z_{i,j}$, the probability that a user who does already know course module i has, at parameter k of the input space, provided the particular parameter value j that the user has provided.

At step 804, for module i, $x_{0,i}$ is calculated by dividing (the total number of users for whom dak=Y for that module) by (the total number of users for whom dak=Y or dak=N for that module). At step 808, $y_{i,j}$ is calculated by dividing (the total number of users for whom dak=Y for that module and the parameter value is j) by (the total number of users for whom dak=Y). At step 808, $z_{i,j}$ is calculated by dividing (the total number of users for whom dak=N for that module and the parameter value is j) by (the total number of users for whom dak=N). At step 810, once these quantities have been calculated, the estimate of $P_{dak}$ for each course module is recalculated by iterating over each k of Np parameters of the user input according to the following procedure.

Before the first parameter of the user input is processed, the working probability that the user doesn't already know the content of the course module, $x_{old,i}$, is initialized to the prior $x_{0,i}$, for each course module i of the plurality of course modules:

$$x_{old,i} := x_{0,i}. \qquad (2)$$

The user input has, for that parameter, a particular value j. At step 810, a new, updated value for x is computed using this information and Bayes' theorem, for each course module i given by:

$$x_{new,i} := \frac{x_{old,i} \cdot y_{i,j}}{x_{old,i} \cdot y_{i,j} + z_{i,j} \cdot (1 - x_{old,i})}. \qquad (3)$$

If the parameter of the user input being processed is not the final parameter of the user input, then the processing proceeds to the next parameter, with $x_{new,i}$ used as an updated estimate:

$$x_{old,i} := x_{new,i}. \qquad (4)$$

If the parameter of the user input being processed is the final parameter of the user input then $P_{dak}$ for a module i is set as the final calculated value $x_{new,i}$ at step 812. After this, the process for computing $P_{dak}$ ends because $P_{dak}$ has been computed for the user for all course modules i up to Nm.

In another embodiment, the process is modified to improve system performance. Computing the relationship between a user input of the user and the usefulness of a course module is a computationally intensive process because it requires updates to and interrogation of a large database of past users. In order to improve system performance, user feedback is cached on the client computer terminal 110 and uploaded to the sever 150 at a manageable frequency and the database is queried at a manageable frequency, such as weekly, rather than for every user.

The clustering analysis is a computationally demanding process but computing the distance in the multidimensional parametric space of user input from a user's user input to a cluster centre is not a computationally demanding process. The cluster analysis is therefore performed weekly and held fixed over the week, with new users being assigned to one of the determined clusters on demand since this is relatively cheap computationally. Similarly, the Bayesian updating process to recalculate the $P_{dak}$ based on the user input is a computationally expensive process but $y_{i,j}$ and $z_{i,j}$ are calculated once a week and held fixed over the week. New users can have $P_{dak}$ determined for them for modules based on the pre-computed values $y_{i,j}$ and $z_{i,j}$. Since no feedback is incorporated into the database over the week, then $y_{i,j}$ and $z_{i,j}$ are unchanged over the week. If all feedback from all users is added at once, then $y_{i,j}$ and $z_{i,j}$ can be computed once for the whole week. In addition to providing system performance benefits, receiving feedback from the user periodically rather than immediately on completion of study of a course module is advantageous as it does not require a continuous network connection to the server 150.

In the context of this disclosure, the term "based on" does not mean "based only on," unless expressly specified otherwise. In other words, the term "based on" describes both "based only on" and "based at least on." The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The methods, process and algorithms that have been described may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. In the context of this disclosure, the term "code" may refer to software, instructions, code or data that is/are executable by a computing device or processor.

Software or instructions or data may also be transmitted over a transmission medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of transmission medium.

Some embodiments have been described. These embodiments are presented by way of example only and are not intended to limit the scope of the disclosure. Indeed, the novel methods and systems described herein may be embodied in a variety of other forms.

Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A computer-implemented method for providing course modules to a user comprising:
   receiving, over a network on a first computer system, a user input from a second computer system, the first computer system comprising an electronic data store storing a database comprising a plurality of user profile records, the database storing an estimate of most-useful course modules for each of the user profile records included in the database;
   storing, by the first computer system, a new user profile record in the database, the new user profile record being generated from the received user input;
   processing, on the first computer system, said received user input to select an estimate of most-useful course modules for the user from a plurality of course modules, wherein selecting the estimate of most-useful course modules comprises:
   computing on the first computer system, for each course module, a probability that the course module needs to be known by the user, wherein computing the probability that each course module needs to be known by the user comprises:
      (a) dividing the database into a plurality of clusters based on a cluster analysis of user profile records stored in the database;
      (b) for each of the plurality of clusters, computing a cluster center and a distance from the user profile record generated from said received user input to the cluster center;
      (c) for each of the plurality of clusters, computing an estimated probability for each course module based on, for each course module, dividing the number of user profile records in the cluster for which a first feedback element is stored for the course module and indicates that the course module did need to be known by the respective user by the number of user profile records in the cluster for which a first feedback element is stored for the course module;
      (d) assigning, to the user, for each course module, the computed estimated probability for the respective course module of the assigned cluster for which the distance from the user profile record of the user to the cluster center is the smallest, computing on the first computer system, for each course module, a probability that the course module is not already known by the user, wherein computing the probability that the course module is not already known by the user comprises:
         (a) initializing the probability that the course module is not already known by the user as an average probability based on dividing the number of user profile records in the database for which a second feedback element is stored for the course module and the second feedback element indicates that the course module was already known by the user by the number of user profile records in the database for which a second feedback element is stored for the course module;
         (b) performing a Bayesian update on the database based on the user profile record generated from said received user input; and
         (c) recalculating the probability that the course module is not already known by the user based on the updated database; and
   selecting one or more of the plurality of course modules based on comparing with a threshold, for each course module, the product of the computed probability that the course module is not already known by the user and the computed probability that the course module needs to be known by the user;
   storing in the database, by the first computer system, the selected estimate of most-useful course modules for the new user profile record;
   outputting, over a network by the first computer system, the selected estimate of most-useful course modules to the second computer system over a network;
   providing, over a network from the first computer system to the second computer system, for completion on the second computer system by the user, a computer-implemented course module from the selected estimate of most-useful course modules;
   receiving, over a network on the first computer system, feedback from the second computer system on the estimate of most-useful course modules, wherein the feedback on the estimate of most-useful course modules comprises, for at least one course module, a first feedback element indicative of whether the course module needed to be known by the user and a second feedback element indicative of whether the course module was already known by the user; and
   updating, on the first computer system, the new user profile record of the database in the electronic data store based on the received feedback,
   wherein the first computer system is a server and the second computer system is a client machine.

2. The method of claim 1, wherein the cluster analysis is a k-means analysis, a k-modes analysis or an expectation-maximization analysis.

3. The method of claim 1, wherein computing the distance from the user profile record generated from the user input to a cluster center comprises computing the Euclidean norm of the difference between the user profile record generated from the user input and the cluster center.

4. The method of claim 1, wherein the updating of the database in the electronic data store comprises updating the database based on the received feedback from a plurality of users, the updating being only performed at predetermined intervals.

5. The method of claim 4, wherein the feedback is only received from users at a predetermined interval.

6. The method of claim 1, wherein the user profile record generated from the user input further comprises one or more of:
   details of previous course modules studied by the user; and
   user information obtained from a third-party database.

7. The method of claim 1, wherein the user input comprises a user's answers to a plurality of questions.

8. A first computer system for providing course modules to a user at a second computer system, the first computer system comprising:
   at least one processor;
   a memory in electronic communication with the at least one processor;
   an external interfaces;
   an electronic data store storing a database comprising a plurality of user profile records, the database storing an estimate of most-useful course modules for each of the user profile records included in the database; and
   instructions stored in the memory, the instructions being executable to:

receive, over a network by the first computer system at the external interface, a user input from the second computer system;

store, by the first computer system, a new user profile record in the database, the new user profile record being generated from the received user input;

process, by the first computer system using the at least one processor, said received user input to select an estimate of most-useful course modules for the user from a plurality of course modules, wherein selecting the estimate of most-useful course modules comprises:

computing on the first computer system, for each course module, a probability that the course module needs to be known by the user, wherein computing the probability that each course module needs to be known by the user comprises:

(a) dividing the database into a plurality of clusters based on a cluster analysis of user profile records stored in the database;

(b) for each of the plurality of clusters, computing a cluster center and a distance from the user profile record generated from said received user input to the cluster center;

(c) for each of the plurality of clusters, computing an estimated probability for each course module based on, for each course module, dividing the number of user profile records in the cluster for which a first feedback element is stored for the course module and indicates that the course module did need to be known by the respective user by the number of user profile records in the cluster for which a first feedback element is stored for the course module;

(d) assigning, to the user, for each course module, the computed estimated probability for the respective course module of the assigned cluster for which the distance from the user profile record of the user to the cluster center is the smallest, computing on the first computer system, for each course module, a probability that the course module is not already known by the user, wherein computing the probability that the course module is not already known by the user comprises:

(a) initializing the probability that the course module is not already known by the user as an average probability based on dividing the number of user profile records in the database for which a second feedback element is stored for the course module and the second feedback element indicates that the course module was already known by the user by the number of user profile records in the database for which a second feedback element is stored for the course module;

(b) performing a Bayesian update on the database based on the user profile record generated from said received user input; and (c) recalculating the probability that the course module is not already known by the user based on the updated database; and selecting one or more of the plurality of course modules based comparing with a threshold, for each course module, the product of the computed probability that the course module is not already known by the user and the computed probability that the course module needs to be known by the user;

store in the database, by the first computer system, the selected estimate of most-useful course modules for the new user profile record;

output, over a network by the first computer system, the selected estimate of most-useful course modules to the second computer system;

provide, over a network from the first computer system to the second computer system using the external interface, for completion on the second computer system by the user, a computer-implemented course module from the selected estimate of most-useful course modules;

receive, over a network by the first computer system on the external interface, feedback from the second computer system on the estimate of most-useful course modules, wherein the feedback on the estimate of most-useful course modules comprises, for at least one course module, a first feedback element indicative of whether the course module needed to be known by the user and a second feedback element indicative of whether the course module was already known by the user; and update, on the first computer system, the new user profile record of the database in the electronic data store based on the received feedback, wherein the first computer system is a server and the second computer system is a client machine.

9. A computer system for providing course modules to a user comprising:

means for receiving, over a network on a first computer system, a user input from a second computer system, the first computer system comprising an electronic data store storing a database comprising a plurality of user profile records, the database storing an estimate of most-useful course modules for each of the user profile records included in the database;

means for storing, by the first computer system, a new user profile record in the database, the new user profile record being generated from the received user input;

means for processing, on the first computer system, said received user input to select an estimate of most-useful course modules for the user from a plurality of course modules, wherein selecting the estimate of most-useful course modules comprises:

computing on the first computer system, for each course module, a probability that the course module needs to be known by the user, wherein computing the probability that each course module needs to be known by the user comprises:

(a) dividing the database into a plurality of clusters based on a cluster analysis of user profile records stored in the database;

(b) for each of the plurality of clusters, computing a cluster center and a distance from the user profile record generated from said received user input to the cluster center;

(c) for each of the plurality of clusters, computing an estimated probability for each course module based on, for each course module, dividing the number of user profile records in the cluster for which a first feedback element is stored for the course module and indicates that the course module did need to be known by the respective user by the number of user profile records in the cluster for which a first feedback element is stored for the course module;

(e) assigning, to the user, for each course module, the computed estimated probability for the respective course module of the assigned cluster for which the distance from the user profile record of the user to the cluster centre is the smallest, computing on the first computer system, for each course module, a probability that the course module is not already known by the user, wherein computing the probability that the course module is not already known by the user comprises:

(a) initializing the probability that the course module is not already known by the user as an average probability based on dividing the number of user profile records in the database for which a second feedback element is stored for the course module and the second feedback element indicates that the course module was already known by the user by the number of user profile records in the database for which a second feedback element is stored for the course module;

(b) performing a Bayesian update on the database based on the user profile record generated from said received user input; and (c) recalculating the probability that the course module is not already known by the user based on the updated database; and selecting one or more of the plurality of course modules based on comparing with a threshold, for each course module, the product of the computed probability that the course module is not already known by the user and the computed probability that the course module needs to be known by the user;

means for storing in the database, by the first computer system, the selected estimate of most-useful course modules for the new user profile record;

means for outputting, over a network by the first computer system, the selected estimate of most-useful course modules to the second computer system;

means for providing, over a network from the first computer system to the second computer system, for completion on the second computer system by the user, a computer-implemented course module from the selected estimate of most-useful course modules;

means for receiving, over a network on the first computer system, feedback from the second computer system on the estimate of most-useful course modules, wherein the feedback on the estimate of most-useful course modules comprises, for at least one course module, a first feedback element indicative of whether the course module needed to be known by the user and a second feedback element indicative of whether the course module was already known by the user; and means for updating, on the first computer system, the new user profile record of the database in the electronic data store based on the received feedback, wherein the first computer system is a server and the second computer system is a client machine.

10. A non-transitory tangible computer-readable medium having instructions thereon, the instructions comprising:

code for receiving, over a network on a first computer system, a user input from a second computer system, the first computer system comprising an electronic data store storing a database comprising a plurality of user profile records, the database storing an estimate of most-useful course modules for each of the user profile records included in the database;

code for storing, by the first computer system, a new user profile record in the database, the new user profile record being generated from the received user input;

code for processing, on the first computer system, said received user input to select an estimate of most-useful course modules for the user from a plurality of course modules, wherein selecting the estimate of most-useful course modules comprises:

computing on the first computer system, for each course module, a probability that the course module needs to be known by the user, wherein computing the probability that each course module needs to be known by the user comprises:

(a) dividing the database into a plurality of clusters based on a cluster analysis of user profile records stored in the database;

(b) for each of the plurality of clusters, computing a cluster center and a distance from the user profile record generated from said received user input to the cluster center;

(c) for each of the plurality of clusters, computing an estimated probability for each course module based on, for each course module, dividing the number of user profile records in the cluster for which a first feedback element is stored for the course module and indicates that the course module did need to be known by the respective user by the number of user profile records in the cluster for which a first feedback element is stored for the course module;

(e) assigning, to the user, for each course module, the computed estimated probability for the respective course module of the assigned cluster for which the distance from the user profile record of the user to the cluster center is the smallest, computing on the first computer system, for each course module, a probability that the course module is not already known by the user, wherein computing the probability that the course module is not already known by the user comprises:

(a) initializing the probability that the course module is not already known by the user as an average probability based on dividing the number of user profile records in the database for which a second feedback element is stored for the course module and the second feedback element indicates that the course module was already known by the user by the number of user profile records in the database for which a second feedback element is stored for the course module;

(b) performing a Bayesian update on the database based on the user profile record generated from said received user input; and (c) recalculating the probability that the course module is not already known by the user based on the updated database; and selecting one or more of the plurality of course modules based on comparing with a threshold, for each course module, the product of the computed probability that the course module is not already known by the user and the computed probability that the course module needs to be known by the user;

code for storing in the database, by the first computer system, the selected estimate of most-useful course modules for the new user profile record;

code for outputting, over a network by the first computer system, the selected estimate of most-useful course modules to the second computer system;

code for providing, over a network from the first computer system to the second computer system, for completion on the second computer system by the user, a computer-implemented course module from the selected estimate of most-useful course modules;

code for receiving, over a network on the first computer system, feedback from the second computer system on the estimate of most-useful course modules, wherein the feedback on the estimate of most-useful course modules comprises, for at least one course module, a first feedback element indicative of whether the course module needed to be known by the user and a second feedback element indicative of whether the course module was already known by the user; and code for updating, on the first computer system, the new user profile record of database in the electronic data store based on the received feedback, wherein the first computer system is a server and the second computer system is a client machine.

* * * * *